United States Patent
Greco et al.

(10) Patent No.: US 7,483,231 B2
(45) Date of Patent: *Jan. 27, 2009

(54) APPARATUS, SYSTEM, AND METHOD FOR REDUNDANT IDENTIFICATION OF A STORAGE MEDIUM FORMAT

(75) Inventors: Paul Merrill Greco, Tucson, AZ (US); Hiroshi Itagaki, Yokohama (JP); Takashi Katagiri, Yokohama (JP); Hirokazu Nakayama, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/553,315

(22) Filed: Oct. 26, 2006

(65) Prior Publication Data

US 2008/0100946 A1    May 1, 2008

(51) Int. Cl.
  *G11B 15/087* (2006.01)
(52) U.S. Cl. ..................................... 360/72.2
(58) Field of Classification Search ....... None
  See application file for complete search history.

(56) References Cited

U.S. PATENT DOCUMENTS

| | | | |
|---|---|---|---|
| 5,327,305 A | | 7/1994 | Thomas |
| 5,414,570 A | * | 5/1995 | Fry et al. ............... 360/48 |
| 5,546,557 A | * | 8/1996 | Allen et al. ............ 360/49 |
| 5,615,056 A | * | 3/1997 | Oguro .................. 386/104 |
| 5,710,676 A | * | 1/1998 | Fry et al. ............... 360/72.2 |
| 5,819,309 A | * | 10/1998 | Gray .................... 711/111 |
| 6,031,698 A | * | 2/2000 | Bar ...................... 360/72.2 |
| 6,611,394 B1 | * | 8/2003 | Kato et al. ............ 360/69 |
| 6,636,942 B2 | * | 10/2003 | Greco ................... 711/112 |
| 7,038,874 B1 | * | 5/2006 | Jaquette et al. ....... 360/69 |

OTHER PUBLICATIONS

E.R. Childers et al., "Six Orders of Magnitude In Linear Tape Technology: The One-Terabyte Project", IBM J. Res. & Dev., vol. 47, No. 4, Jul. 2003, pp. 471-482.

Barry Kadleck et al., "IBM Total Storage Enterprise Tape 3592: Presentation Guide", IBM Redbooks, Feb. 2004.

* cited by examiner

*Primary Examiner*—Hoa T Nguyen
*Assistant Examiner*—James L Habermehl
(74) *Attorney, Agent, or Firm*—Kunzler & McKenzie (57) ABSTRACT

An apparatus, system, and method are disclosed for redundant identification of a storage medium format. The apparatus for redundant identification of a storage medium format is provided with a plurality of modules configured to functionally execute the necessary steps of writing a Format Identification Data Set ("FID") to a plurality of predetermined locations on the storage medium, determining a format of the storage medium based on information in the FID, and setting a starting position on the storage medium for a subsequent operation, wherein the starting position is associated with the format of the storage medium. These modules in the described embodiments include a write module, a determination module, and a position module. In a further embodiment, the storage medium may include a data storage tape housed within a tape cartridge, wherein the tape cartridge further comprises a cartridge memory ("CM") for storing a CM FID.

17 Claims, 7 Drawing Sheets

APPARATUS, SYSTEM, AND METHOD FOR REDUNDANT IDENTIFICATION OF A STORAGE MEDIUM FORMAT

BACKGROUND OF THE INVENTION

1. Field of the Invention

This invention relates to storage systems and more particularly relates to redundant identification of a storage medium format.

2. Description of the Related Art

Common storage media and storage systems include various hardware and media configurations and formats. As technology progresses, storage densities improve, error rates are reduced, and data reliability is increased. These advances are typically implemented in successive versions, revisions, or generations of storage systems or storage media products.

For example, the 3592 Enterprise™ tape storage system offered by International Business Machines® ("IBM") is just one of many members of a family of storage system products. Changes may be implemented in various revisions and generations even among individual models. For example, the model 3592 Enterprise™ tape storage system includes a First Generation ("G1"), and a Second Generation ("G2"). In this example, the read and write format of G1 is different from the read and write format of G2.

Since various media formats may exist, common storage media often include identifiers for informing devices that may interface with the storage media of which format is being employed. For example, in the operation diagram depicted in FIG. 1, a tape storage medium 102 may include a Format Identification Data Set ("FID") 106 for identifying the format of the user data 108 written on the tape 102.

A typical tape cartridge may include a Cartridge Memory ("CM") for storing the FID and other information used by a tape drive for reading data stored on the tape cartridge. However, in certain situations the CM may not be available. For example, the data in the CM may be corrupted, the drive may be unable to read the CM, or the like. In response to this issue, tape drives often write a backup version of the FID at the beginning of the tape, so that the drive can continue to function even if the CM is unavailable.

If the FID is unavailable, the drive is unable to determine the layout information required to read and write the tape. Layout information may include the track pitch, encryption data, compression data, and the like. If this information is unavailable, the tape drive is unable to read or write data to the tape cartridge.

Figure 1:
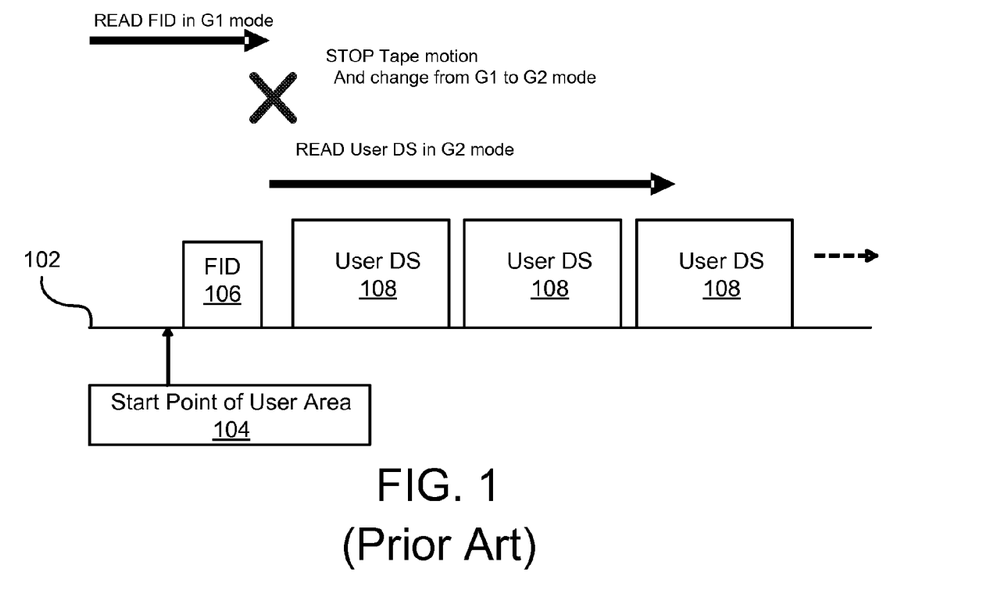
FIG. 1 is an operation diagram illustrating a common configuration of an exemplary storage medium and the operations for reading the storage medium.

In the example depicted in FIG. 1, a typical tape storage system includes a tape data storage medium 102. The tape 102 typically has a predetermined start point 104 of a user area. In a common system, the FID 106 is located at the start point 104. User data 108 is then typically written on the portion of the tape 102 following the FID 106. However, certain problems may arise when tapes 102 configured for different generations of storage equipment are employed. For example, an error may occur if a G2 tape is loaded into a G1 tape drive. Although the tape 102 may be physically compatible with the drive, the formats may be incompatible.

In response to these issues, many manufacturers make successive versions backwards compatible with prior versions of the same model. For example, the G2 version of the model 3592 Enterprise™ tape storage system may also be compatible with the G1 version. In such an example, the G2 drive may still be able to read and write data on a G1 format tape 102.

In the example depicted in FIG. 1, the model 3592 Enterprise™ tape drive reads the FID 106 at the starting point 104 of the user area on the tape 102. Typically the FID 106 is written in G1 format so that both G1 and G2 devices can use the tape 102. If FID 106 indicates that the tape 102 is in the G2 format, the drive must stop the tape 102 and change internal read and write components and drivers to be compatible with the G2 format. Only then can the drive continue to read the user data 108 on the tape 102.

This problem is exacerbated with certain operations. For example, when a typical drive rewinds a tape 102, the drive usually reads the FID 106. In such an example, each time the tape 102 is rewound, the drive must change to G1 configuration to read the FID 106 and then change back to G2 configuration to continue reading the user data 108. Each of these changes requires the tape 102 to stop and internal configuration to change. These operations typically waste read and write time. Additionally, in systems where mechanical components are required to change in order to change configurations, excessive wear and tear may occur.

SUMMARY OF THE INVENTION

From the foregoing discussion, it should be apparent that a need exists for an apparatus, system, and method that redundantly identify a storage medium format. Beneficially, such an apparatus, system, and method would reduce read and write time to the storage medium, and reduce wear and tear on mechanical components of some storage media.

The present invention has been developed in response to the present state of the art, and in particular, in response to the problems and needs in the art that have not yet been fully solved by currently available data storage systems. Accordingly, the present invention has been developed to provide an apparatus, system, and method for redundant identification of a storage medium format that overcome many or all of the above-discussed shortcomings in the art.

The apparatus for redundant identification of a storage medium format is provided with a plurality of modules configured to functionally execute the necessary steps of writing a Format Identification Data Set ("FID") to a plurality of predetermined locations on the storage medium, determining a format of the storage medium based on information in the FID, and setting a starting position on the storage medium for a subsequent operation, wherein the starting position is associated with the format of the storage medium. These modules in the described embodiments include a write module, a determination module, and a position module. In a further embodiment, the storage medium may include a data storage tape housed within a tape cartridge, wherein the tape cartridge further comprises a cartridge memory ("CM") for storing a CM FID.

In one embodiment, the write module further comprises a build module. The build module may be configured to construct a first FID in a first format, wherein the write module writes the first FID to a first location on the storage medium, and to construct a second FID in a second format, wherein the write module writes the second FID to a second location on the storage medium. In a certain embodiment, the first location and the second location are separated by a predetermined volume of the storage medium.

In a further embodiment, the determination module may be further configured to read the first FID in response to a determination that the CM FID is unavailable. Additionally, the determination module may include a recovery module configured to recover the format of the storage medium from one of the first FID and the second FID in response to an error in reading one of the first FID and the second FID.

In a further embodiment, the position module may be configured to set the starting position to the first location in response to a determination that the storage medium is formatted in the first format, and set the starting position to the second location in response to a determination that the storage medium is formatted in the second format.

A system of the present invention is also presented for redundant identification of a storage medium format. In one embodiment, the system may include a tape cartridge and a tape drive. The tape cartridge may include a data storage tape, and a cartridge memory ("CM") configured to store a CM FID. In a further embodiment, the tape drive may be configured to write a Format Identification Data Set ("FID") to a plurality of predetermined locations on the tape cartridge, determine a format the tape cartridge based on information in the FID, and set a starting position on the tape cartridge for a subsequent operation, wherein the starting position is associated with the format of the tape cartridge.

A method of the present invention is also presented for redundant identification of a storage medium format. The method in the disclosed embodiments substantially includes the steps necessary to carry out the functions presented above with respect to the operation of the described apparatus and system. In one embodiment, the method includes writing a Format Identification Data Set ("FID") to a plurality of predetermined locations on the storage medium, determining a format of the storage medium based on information in the FID, and setting a starting position on the storage medium for a subsequent operation, wherein the starting position is associated with the format of the storage medium.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
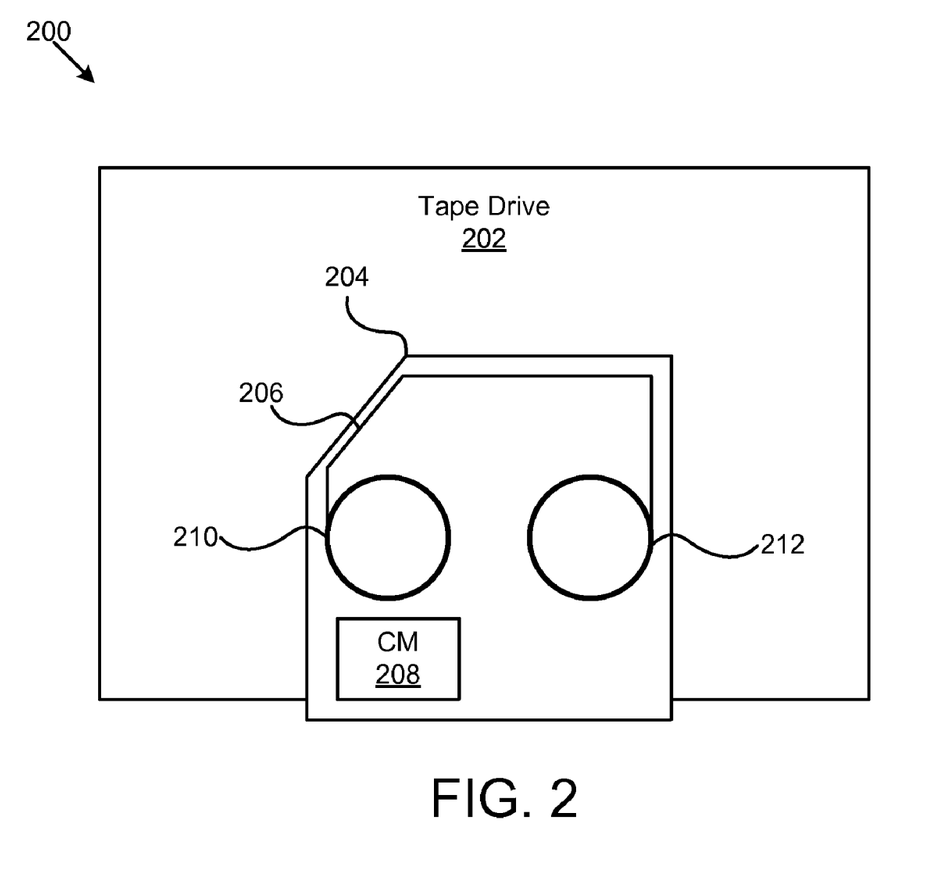
FIG. 2 is a schematic block diagram illustrating one embodiment of a system for redundant identification of a storage medium format.

FIG. 2 is a schematic block diagram illustrating one embodiment of a system 200 for redundant identification of a storage medium format. In the depicted embodiment, the system includes a tape drive 202 and a tape cartridge 204. The tape cartridge may include a data storage tape 206. Additionally, the tape cartridge 204 may include a CM 208 for storing a CM FID. In the depicted embodiment, the tape cartridge 204 may additionally include a tape reel 210 and a winding reel 212.

Although the exemplary embodiment of a system 200 for redundant identification of a storage medium format depicted in FIG. 2 includes a tape storage system, other data storage systems incorporating different types of storage media may incorporate the apparatus and method disclosed herein. Indeed, the scope of the described embodiments of the apparatus and method should not be limited only to tape storage systems, but include various other data storage systems.

In one exemplary embodiment, the tape drive 202 may be configured to write an FID to multiple locations on the tape cartridge 204. For example, the tape drive 202 may write the FID to the CM 208, and to one or more predetermined locations on the tape 206. Additionally, the tape drive 202 may write the FIDs in two or more different formats, depending on the number of preceding generations or versions of that model of the tape drive 202 or on the number of models with which the tape drive 202 is configured to be compatible. For example, the tape drive 202 may include a model 3592 Enterprise™ tape drive. A G2 model 3592 Enterprise™ tape drive 202 may be configured to write an FID to the CM 208, a first FID in a first format which is compatible with G1 drives 202 to a first location on the tape 206, and a second FID in a second format which is compatible with G2 drives 202 to a second location on the tape 206.

A tape drive 202 may determine a format of the tape cartridge 204 based on information in the FIDs written thereon. For example, when a tape cartridge 204 is inserted into the tape drive 202, the drive 202 may read the FID stored in the CM 208 to determine whether the cartridge is configured in G1 format or in G2 format, or in any other format identifiable by an FID. The CM 208 may include a memory and an interface to the tape drive 202. If the FID in the CM 208 is unavailable, the tape drive 202 may read a backup version of the FID on the tape 206. In the example of the model 3592 Enterprise™ tape system, the tape drive 202 may read the first FID written in the G1 format. The G1 FID may be located at the beginning of the tape in a predetermined location. Alternatively, the tape drive 202 may read a second FID written in the G2 format. The G2 FID may be located at a different predetermined location on the tape 206.

The tape drive 202 may set a starting position on the tape 206 for a subsequent operation based on the format of the tape 206. For example, if it is determined that a model 3592 Enterprise™ tape 206 is written in a G1 format, the tape drive 202 may set the beginning of the tape or the location of the G1 FID as the start point for subsequent operations. Alternatively, if it is determined that the tape 206 is written in the G2 format, the tape drive 202 may set the location of the G2 FID as the start point for subsequent operations.

Figure 3:
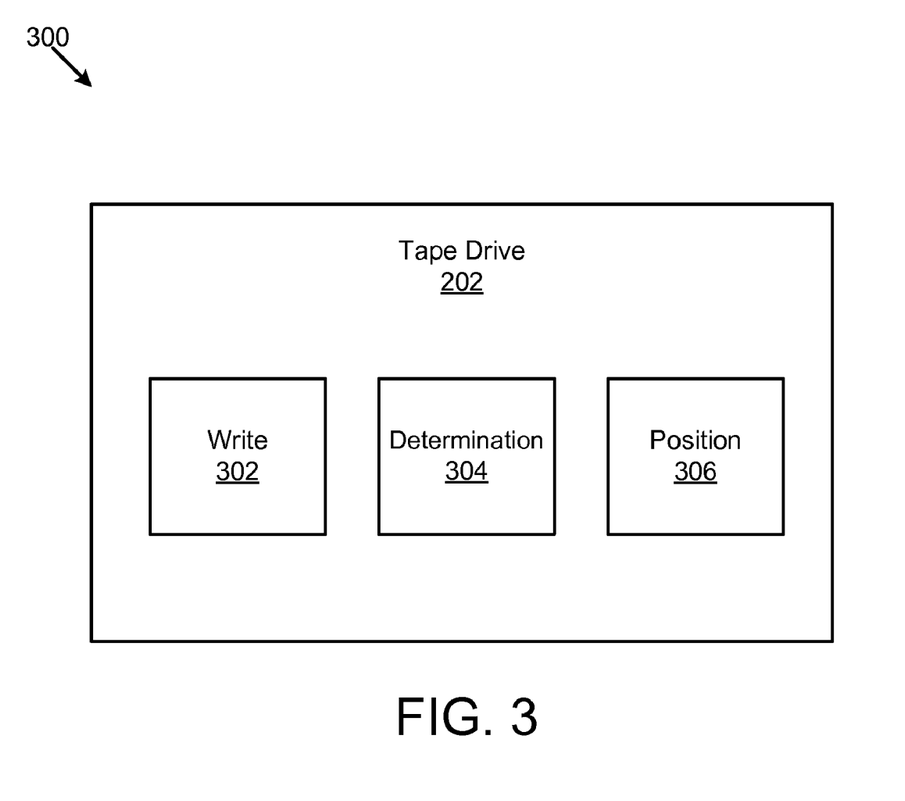
FIG. 3 is a schematic block diagram illustrating one embodiment of an apparatus for redundant identification of a storage medium format.

FIG. 3 is a schematic block diagram illustrating one embodiment of an apparatus 300 for redundant identification of a storage medium format. In one embodiment, the apparatus 300 may include the tape drive 202. For example, the tape drive 202 may include firmware or software modifications configured to enable the tape drive 202 to carry out the operations of the apparatus 300. Alternatively, the apparatus 300 may include a module, circuit card, or device housed either within the tape drive 202 or separate from the tape drive 202. In a further embodiment, the apparatus 300 may be coupled to a storage medium or housing for a storage medium.

In one embodiment, the apparatus 300 is configured to write an FID to a plurality of predetermined locations on the storage medium. Additionally, the apparatus 300 may determine a format of the storage medium based on information in the FID. In a further embodiment, the apparatus 300 may set a starting position on the storage medium for a subsequent operation based on the format of the storage medium indicated by the FID. In a certain embodiment, these functions are carried out by modules of the apparatus 300. These modules may include a write module 302, a determination module 304, and a position module 306.

In one embodiment, the write module 302 may interface with the tape drive 202 to write the FIDs to the predetermined locations. For example, the write module 302 may prepare the FIDs in various formats. The write module 302 may then use the read/write heads of the tape drive 202 to write the FIDs to the tape 206. The write module 302 may also use a CM interface component of the tape drive 202 to write the CM FID to the CM 208.

Similarly, the determination module 304 may also have a close relationship with standard modules of the tape drive 202. For example, the determination module 304 may obtain the FID from a read head of the tape drive 202. The determination module 304 may then determine the format of the storage medium based on the format of the FID. In model 3592 Enterprise™ example, the determination module 304 may determine that the tape is in G1 format if the FID is written in a G1 format. Alternatively, the determination module 304 may obtain encoding, or other format information from the FID and determine the format of the storage medium independently of the format of the FID. For example, in order to allow both G1 and G2 tape drives 202 to read the FID, a first FID may be written in G1 format. However, the first FID may indicate that the tape 206 is to be written in a G2 format.

In the example above, the position module 306 may set the starting point to the predetermined location of the second FID written in G2 format for all subsequent operations on the tape 206. The set module may include an interface with the memory of the tape drive 202 for storing the location of the G2 FID. Additionally, the position module 306 may interface with tape positioning servos or tape winding motors to set the start positions for operations such as read, write, rewind, fast forward, and the like.

Figure 4:
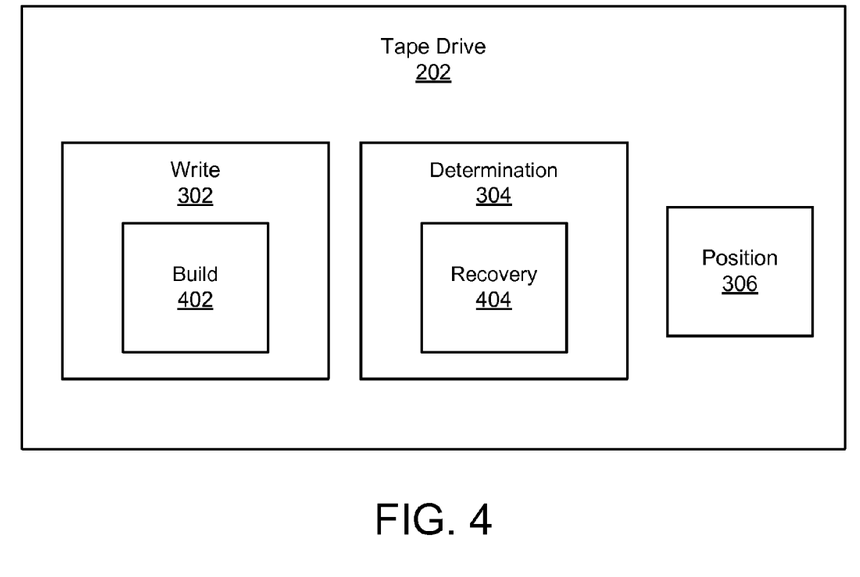
FIG. 4 is a detailed schematic block diagram illustrating one embodiment of an apparatus for redundant identification of a storage medium format.

Further embodiments of the write module 302, the determination module 304, and the position module 306 may exist. FIG. 4 is a detailed schematic block diagram illustrating a further embodiment of the apparatus 300. In the depicted embodiment, the write module 302 includes a build module 402. Additionally, the determination module 304 may include a recovery module 404.

In one embodiment, the writer module 302 may include a build module 402 configured to construct a first FID in a first format, and a second FID in a second format. The write module 302 may then write the first FID to a first location on the storage medium and write the second FID to a second location on the storage medium. The first and the second locations may be predetermined. Alternatively, the locations may be determined by a user of the tape drive 202 or a tape drive controller. In one embodiment, the build module 402 may include a memory or buffer for collecting encoding and formatting data for the FID.

Since the storage medium may be used in different generations or versions of a storage system, the first location and the second location may be separated by a predetermined volume of the storage medium to prevent inadvertently overwriting data. For example, if the storage medium is a tape 206, the first FID may be placed at a location at the beginning of the tape 206. The second FID may be separated from the first FID by a predetermined length of tape 206. For example, there may be an industry standard that an FID rewrite must be completed within 4 meters of tape, so the second location may be placed at 4.2 meters to avoid allowing a first generation device to inadvertently overwrite the second FID while rewriting the first FID.

In certain embodiments, the apparatus 300 may be configured to read the FID from the CM 208 in most situations. However, in the event that the CM 208 is unavailable, the determination module 304 may obtain the FID information from the tape 206 at either the first location or the second location. In one embodiment, the determination module 304 may be configured to initially obtain the FID information from the first location on the tape 206 and then the positioning module 306 may be configured to set the start point to the location of whichever FID is identified by the determination module 304 as the primary FID for the tape cartridge format. However, certain scenarios may arise in which the identified FID is corrupt or not readable.

In one embodiment, the determination module 304 may further comprise a recovery module 404 configured to recover the format of the storage medium from whichever other FID is readable and valid. For example, if the positioning module 306 sets the second location as the start point for subsequent operations, the recovery module 404 may recover the FID information from the first FID at the first location in the event that the second FID is corrupt or unreadable. The opposite situation may also occur, wherein the first location is set as the start point, but the recovery module 404 recovers the FID information from the second FID at the second location.

Figure 5A:
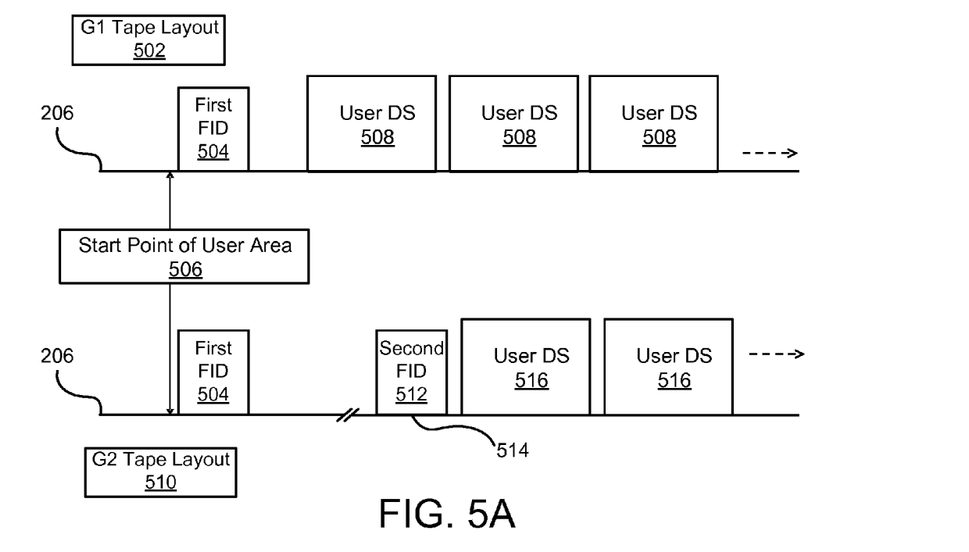
FIG. 5A is schematic block diagram illustrating one embodiment of an implementation of redundant identification of a storage medium format.

FIG. 5A is schematic block diagram illustrating one embodiment of an implementation of redundant identification of a storage medium format. In the depicted embodiment, the storage medium includes a data storage tape 206. In the G1 tape layout 502, the tape 206 may include a first FID 504 written in the G1 format. The first FID 504 may be written at the beginning of the tape 206, or at the start point 506 of the user area. The user data 508 may be written on the tape 206 in the space following the first FID 504.

However, with implementation of the apparatus 300, the G2 tape layout 510 of the tape 206 may include the first FID 504 at the start point 506 of the user area as well as a second FID 514 written in the G2 format at a second predetermined location 514. In one embodiment, the user data 516 is written in the space following the second FID 512.

Figure 5B:
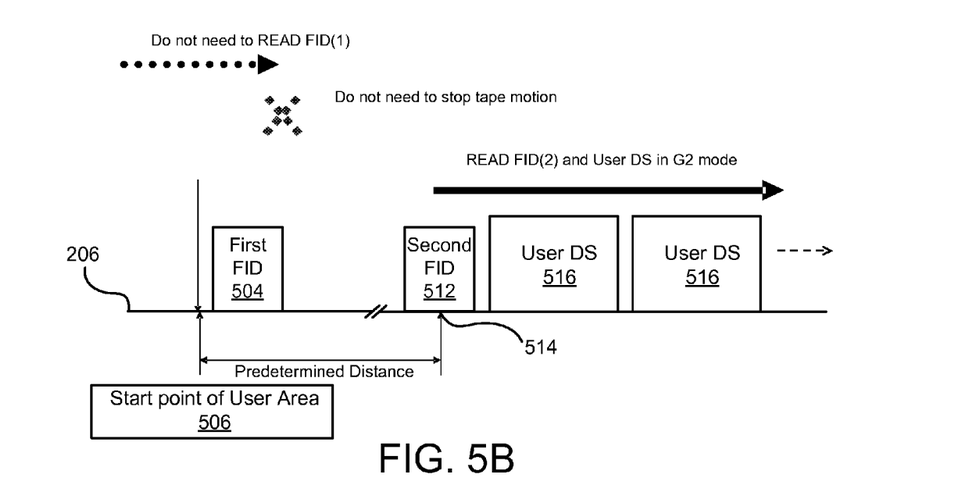
FIG. 5B is an operation diagram illustrating the operation of the exemplary embodiment of FIG. 5A.

FIG. 5B is an operation diagram illustrating the operation of the exemplary embodiment of FIG. 5A. Several scenarios are discussed with relation to the model 3592 Enterprise™ tape storage system. As discussed above, the model 3592 Enterprise™ tape storage system includes two generations, G1 and G2. Although FIG. 5B is described in terms of scenarios of operation of the model 3592 Enterprise™ tape storage system, it should be clear to one of ordinary skill in the art that the described system 200, apparatus 300, and methods may be implemented in other models of tape storage devices, and with other storage media such as disk drives, flash memory, and the like.

If the CM 208 is operational, and a G1 format tape cartridge 204 is inserted into a G1 tape drive 202, the products may function in the same way as the typical G1 drive 202. However, if a G2 tape cartridge 204 is inserted into the G1 drive 202, the drive 202 may report an error with relation to read, locate, and space commands. The drive may then allow write operations if the current position is at the start point 506 of the user area. In such a scenario, the G1 drive may write the first FID 504 and change the format information in the CM 208 to indicate that the G2 tape cartridge 204 has been reformatted from G2 format to G1 format.

If the CM 208 is operational, and a G1 format tape cartridge 204 is inserted into a G2 tape drive 202, the tape drive may operate normally by writing user data 508 after the First FID 504 and setting the starting position to the start point 506 of the user area. However, if a G2 format tape cartridge 204 is inserted into a G2 tape drive 202, the position module 306 may set the start point to the second location 514 for all subsequent operations. Then the user data 516 may be written in the space following the second FID 512.

When the CM 208 is not available, and a G1 drive 202 attempts to read a tape cartridge 204 of an unknown format, the drive 202 may attempt to read the first FID 504. The drive 202 may then obtain the recording format information from the contents of the first FID 504. Then the drive 202 may operate as if the CM 208 was available.

A G2 drive 202 may operate slightly differently. If the CM 208 is unavailable, and an unknown tape cartridge 204 is inserted into a G2 drive 202, the drive 202 may attempt to read the first FID 504 from the start point 506 of the user area. The determination module 304 may then obtain the recording format information from the contents of the first FID 504 and determine whether the tape 206 is in the G1 or the G2 format. If the tape 206 is in G1 format, the position module 306 sets the starting position to the start point 506 of the user area. However, if the tape 206 is in G2 format, the position module 306 may set the start point to the location 514 of the second FID 512 for all subsequent operations.

In this embodiment, when a command for a subsequent operation is issued, the drive 202 will not need to change from G2 configuration to G1 configuration in order to read the first FID 504 and then back again in order to read the user data 516. Instead, the drive 202 may simply go the start point set by the position module 306, read the second FID 512 written in the G2 format, and continue reading the user data 516 without having to stop and change drive configurations.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
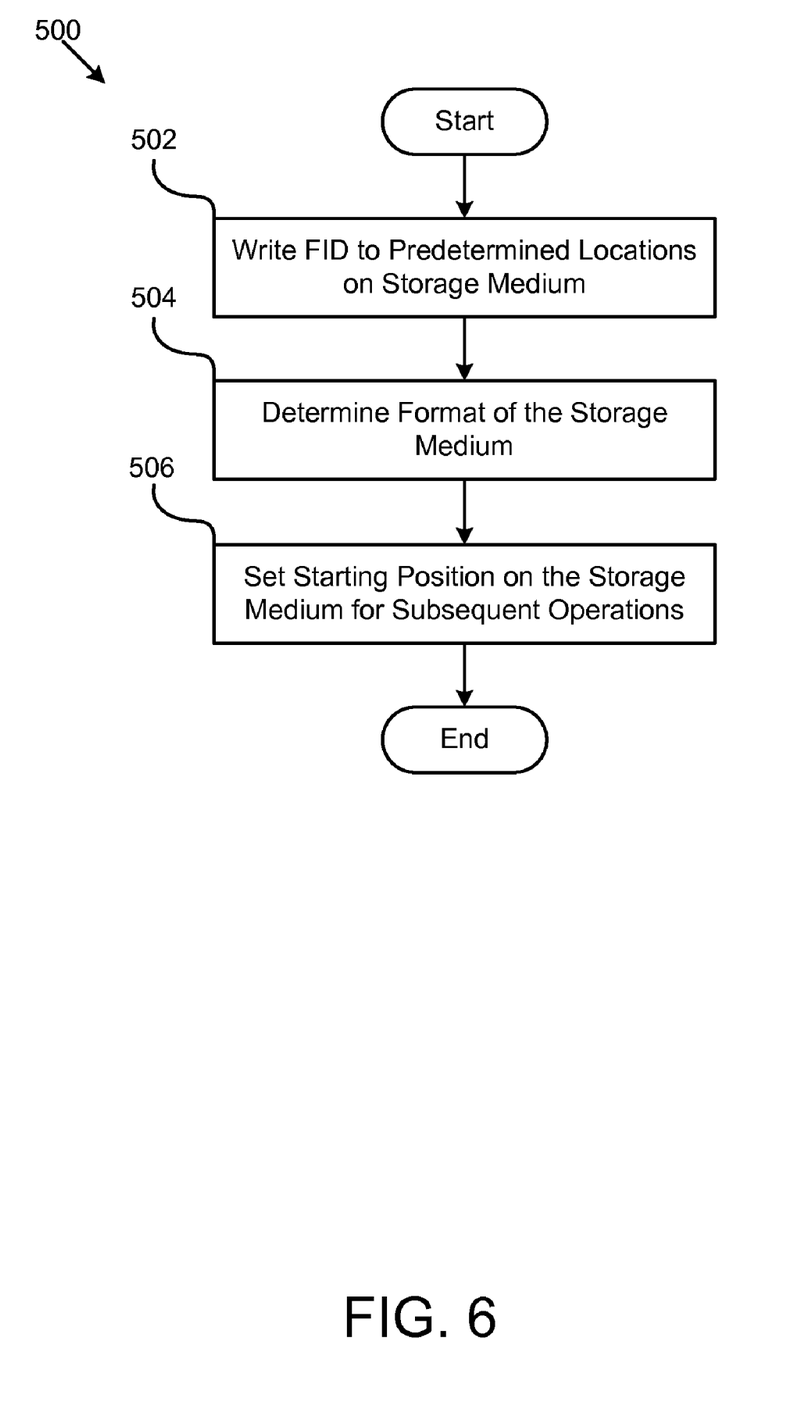
FIG. 6 is a schematic flow chart diagram illustrating one embodiment of a method for redundant identification of a storage medium format.

FIG. 6 is a schematic flow chart diagram illustrating one embodiment of a method 600 for redundant identification of a storage medium format. In one embodiment, the method 600 starts when the write module 302 writes 602 an FID to multiple predetermined locations on the storage medium 206. In one embodiment, the write module 302 may write 602 a first FID 504 to a first location 506 in a first format, and a second FID 512 to a second location 514 in a second format.

The determination module 304 may then determine 604 the format of the storage medium 206 based on information contained within the FID 504 or based on the format of the FID 504 itself. The position module 306 may then set 606 the starting position 506, 514 on the storage medium 206 for a subsequent operation. The starting position 506, 514 may be associated with the format of the storage medium 206.

Figure 7:
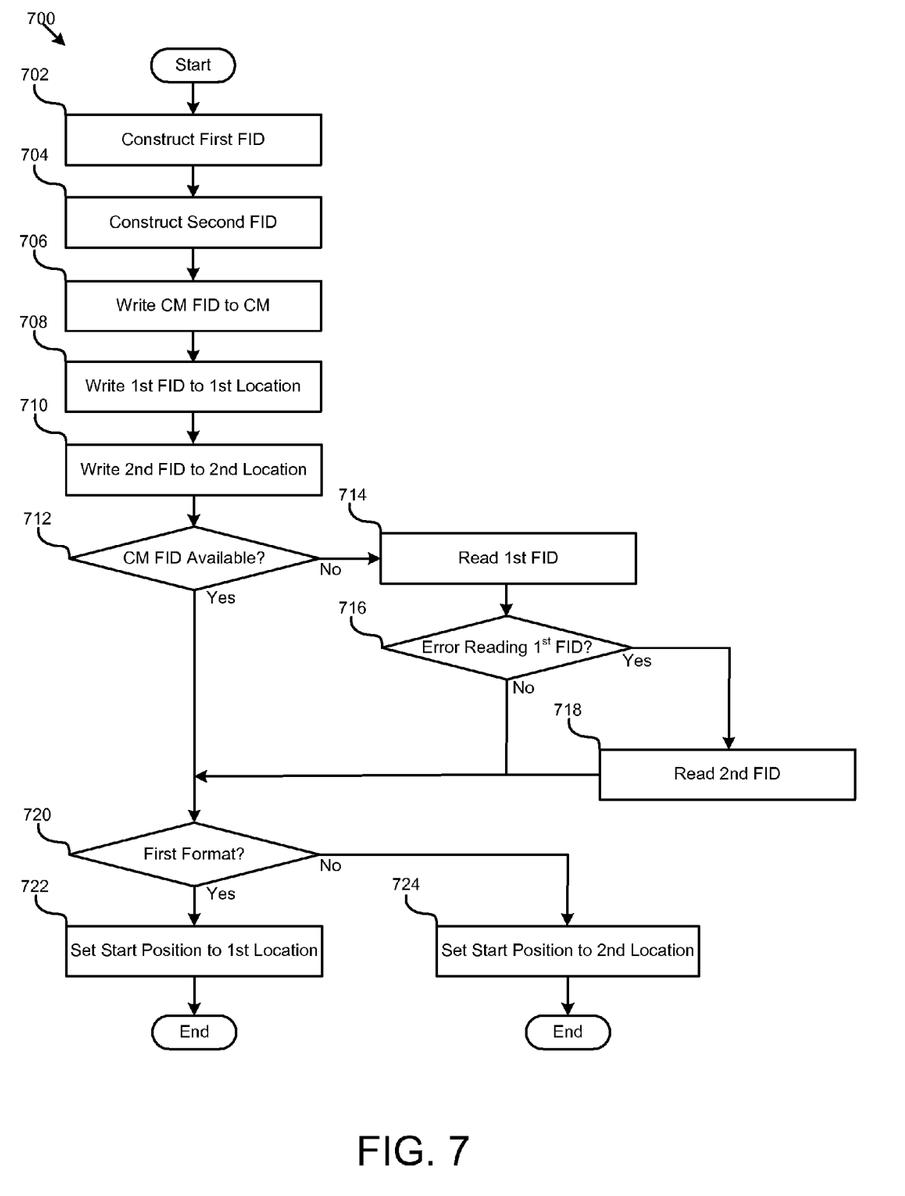
FIG. 7 is a detailed schematic flow chart diagram illustrating another embodiment of a method for redundant identification of a storage medium format.

FIG. 7 is a detailed schematic flow chart diagram illustrating another embodiment of a method 700 for redundant identification of a storage medium format. This embodiment of the method 700 starts when the build module 402 constructs 702 a first FID 504 in a first format and constructs 704 a second FID 512 in a second format. The write module 302 may then write 706 the FID to the CM 208. Additionally, the write module 302 may write 708 the first FID 504 to the first location 506 on the tape 206. The write module 302 may also write 710 the second FID 512 to the second location 514 on the tape 206.

If it is determined 712 that the CM 208 is not available, the apparatus 300 may read 714 the first FID 504 from the first location 506 on the tape 206. If it is determined 716 that there is an error reading the first FID 504, the recovery module 404 may read 718 the second FID 512 from the second location 514 on the tape 206. Once the format information is obtained from the FID 504, 512, the determination module 304 determines 720 whether the tape 206 is in the first format. If it is determine 720 that the tape 206 is in the first format, the position module 306 sets 722 the start position to the first location 506 for subsequent operations. However, if it is determined 720 that the tape 206 is in the second format, the position module 306 sets 724 the start position to the second location 514 for subsequent operations. Once the position module 306 sets 722, 724 the starting position, the method 700 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for redundant identification of a storage medium format, the apparatus comprising:
   a write module in communication with a storage medium and comprising a build module that constructs a first Format Identification Data Set ("FID") in a first format and a second FID in a second format, and configured to write the first FID to a first location and the second FID to a second location on the storage medium;
   a determination module in communication with the storage medium, and configured to determine a format of the storage medium based on information in the FIDs; and
   a position module in communication with the determination module, and configured to set a starting position on the storage medium for a subsequent operation, wherein the starting position is associated with the format of the storage medium.

2. The apparatus of claim 1, wherein the first location and the second location are separated by a predetermined volume of the storage medium.

3. The apparatus of claim 1, wherein the position module is farther configured to:
   set the starting position to the first location in response to a determination that the storage medium is formatted in the first format; and
   set the starting position to the second location in response to a determination that the storage medium is formatted in the second format.

4. The apparatus of claim 1, wherein the storage medium further comprises a data storage tape housed within a tape cartridge, wherein the tape cartridge further comprises a cartridge memory ("CM") for storing a CM FID.

5. The apparatus of claim 4, wherein the determination module is further configured to read the first FID in response to a determination that the CM FID is unavailable.

6. The apparatus of claim 1, wherein the determination module further comprises a recovery module configured to recover the format of the storage medium from one of the first FID and the second FID in response to an error in reading one of the first FID and the second FID.

7. A system for redundant identification of a storage medium format, the system comprising:
   a tape cartridge comprising:
      a data storage tape; and
      a cartridge memory ("CM") configured to store a CM FID;
   a tape drive in communication with the tape cartridge, the tape drive configured to:
      construct a first FID in a first format;
      construct a second FID in a second format;
      write the first FID to a first location on the tape cartridge;
      write the second FID to a second location on the tape cartridge;
      determine a format for the tape cartridge based on information in the FIDs; and
      set a starting position on the tape cartridge for a subsequent operation, wherein the starting position is associated with the format of the tape cartridge.

8. The system of claim 7, wherein the first location and the second location are separated by a predetermined length of the data storage tape.

9. The system of claim 7, wherein the tape drive is further configured to:
   set the starting position to the first location in response to a determination that the tape cartridge is formatted in the first format; and
   set the starting position to the second location in response to a determination that the tape cartridge is formatted in the second format.

10. The system of claim 7, wherein the tape drive is further configured to read the first FID in response to a determination that the CM FID is unavailable.

11. The system of claim 7, wherein the tape drive is further configured to recover the format of the storage medium from one of the first FID and the second FID in response to an error in reading one of the first FID and the second FID.

12. A computer program product comprising a computer readable medium having computer usable program code programmed for redundant identification of a storage medium format, the operations of the computer program product comprising:

constructing a first FID in a first format;

constructing a second FID in a second format;

writing the first FID to a first location on the storage medium;

writing the second FID to a second location on the storage medium;

determining a format of the storage medium based on information in the FIDs; and setting a starting position on the storage medium for a subsequent operation, wherein the starting position is associated with the format of the storage medium.

13. The computer program product of claim 11, wherein the operations further comprise separating the first location and the second location by a predetermined length of the data storage tape.

14. The computer program product of claim 11, wherein the operations further comprise:

setting the starting position to the first location in response to a determination that the storage medium is formatted in the first format; and setting the starting position to the second location in response to a determination that the storage medium is formatted in the second format.

15. The computer program product of claim 11, wherein the operations further comprise reading the first FID in response to a determination that the CM FID is unavailable.

16. The computer program product of claim 11, wherein the operations further comprise recovering the format of the storage medium from one of the first FID and the second FID in response to an error in reading one of the first FID and the second FID.

17. A method for redundant identification of a storage medium format, the method comprising:

constructing a first FID in a first format;

constructing a second FID in a second format;

writing the first FID to a first location on the storage medium;

writing the second FID to a second location on the storage medium;

determining a format of the storage medium based on information in the FIDs; and setting a starting position on the storage medium for a subsequent operation, wherein the staffing position is associated with the format of the storage medium.

\* \* \* \* \*